Dec. 30, 1930. M. ORR 1,787,321
AIRPLANE WING
Filed Aug. 12, 1929

INVENTOR
Matthew Orr.

Patented Dec. 30, 1930

1,787,321

UNITED STATES PATENT OFFICE

MATTHEW ORR, OF DILLON, MONTANA

AIRPLANE WING

Application filed August 12, 1929. Serial No. 385,317.

This invention relates to improvements in aircraft, specifically of heavier-than-air type, and it consists of the constructions, combinations and arrangements herein described and claimed.

An object of the invention is to provide complementary air foils for the main wing or air foil of an airplane for the purpose of accentuating the air pressure on the lower side and diminishing the air pressure on the upper side.

Another object of the invention is to establish a Venturi opening in proximity to the leading edge of the main plane and throughout its length for the purpose of increasing the lifting effect during the forward propulsion of the aircraft.

Other objects and advantages will appear in the foregoing specification, reference being had to the accompanying drawing, in which:—

Figure 1:
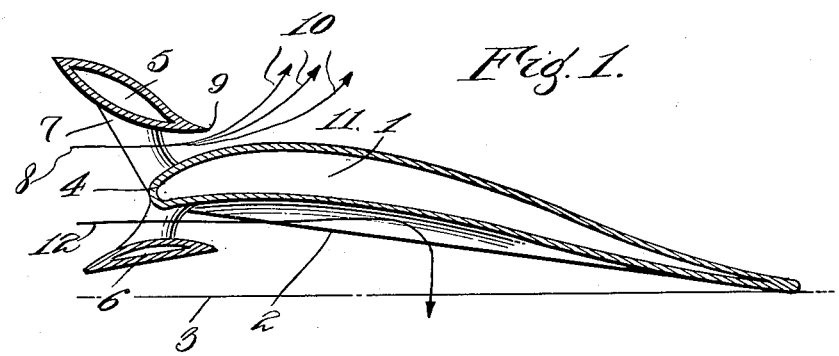
Figure 2:
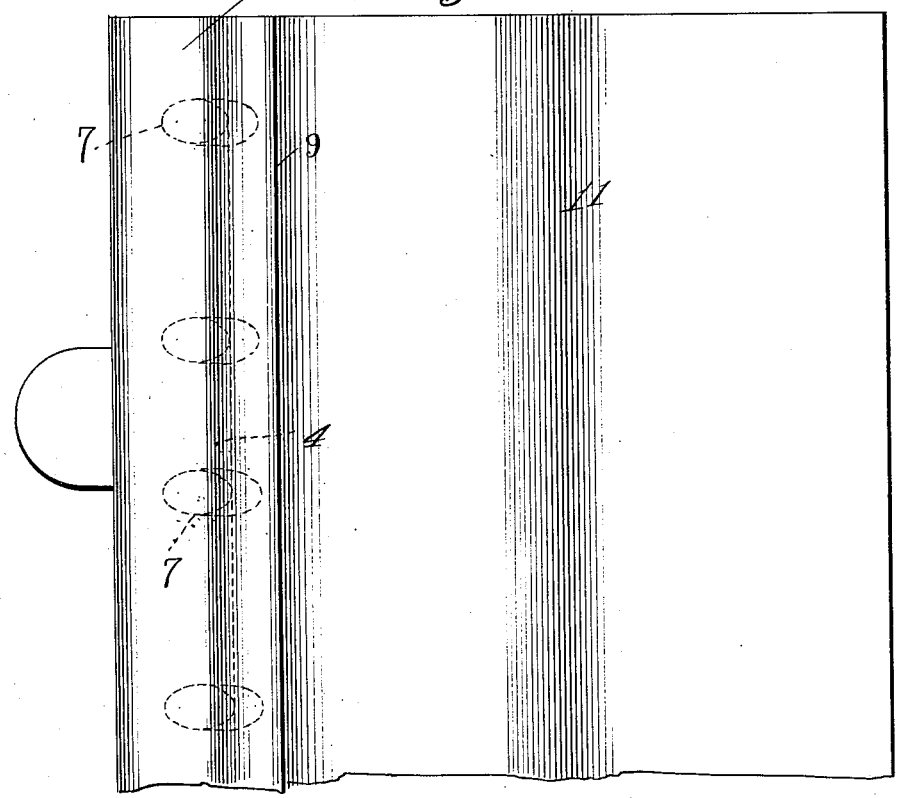

Figure 1 is a cross-section of the main plane of an aircraft illustrating the location of the complementary air foils in forming the Venturi opening in proximity to the leading edge; and Figure 2 is a fragmentary plan view.

It requires only a brief reference to the principle of sustentation of an aircraft to state that it is the downward deflection of the air stream against the lower side of an airplane wing when the latter is set at an angle of incidence to the line of forward travel that comprises the supporting factor. The reaction of the deflected air stream causes the craft to rise, and it is commonly known that the camber or arched surface of the airplane wing contributes largely to the lifting effect because it is across this that the air is rarefied, and by virtue of the reduction in pressure causes a predominance of the upward pressure, all in support of the craft.

The main plane 1 of an aircraft may be regarded as of a conventional cross-sectional shape. The chord is indicated at 2 and the line of flight at 3.

Situated in proximity to the leading edge 4 of the main plane is a pair of complementary air foils 5, 6. One is situated above the leading edge, the other below. They have a common support 7 of any appropriate description.

While the upper and lower air foils are shown as being fixed to the support 7, hence to the leading edge 4, it is distinctly within the province of the invention to provide a known and conventional pivotal hanging for the air foils, as well as some known means for adjusting the air foils in reference to the support and fixing the adjustment after it is arrived at.

The complementary air foils slant away from the leading edge. In other words, they are flared forwardly, producing what may be described as a Venturi opening of elongated form. The extent of the opening is equal to the length of the main plane. Inasmuch as the opening is flared, it follows that it is widest at the front and narrowest at the rear.

In operation, the complementary air foils perform as follows: The component 8 of the air stream, which presumably is parallel to the line of flight 3, will be crowded between the trailing edge 9 of the upper air foil and the adjoining camber of the main plane 1. As soon as the compressive effect of the narrow opening is lost upon the air stream, the latter will spread out and upwardly as denoted by the arrows 10. A rarefication of the atmosphere will occur in the region 11 to a more marked degree than in conventional types of airplane wings.

Agreeable with the increasedly negatived pressure on the upper side of the main plane, the air pressure is increased on the lower side. The pressure is accentuated by the lower air foil 6. This stands at such a position in reference to the main plane that the component 12 of the air stream will be directed sharply against the convex under side of the main plane, and deflected downwardly as indicated by the arrow. It is known that the effect of a Venturi tube is to produce a discharge of fluid from a receptacle at a rate much faster than is possible with a straight-sided tube.

On the same principle it is proposed to produce the venturi effect by disposing the complementary air foils 5 and 6 in the manner indicated. The tendency will be to drive the air through at an accentuated rate, but by virtue of the disposition of the trailing edges of the air foils relatively to the adjoining surfaces of the main plane, the upper component 8 of the air stream will be deflected upwardly at a sharp angle and the lower component 9 deflected downwardly at an even sharper angle. By virtue of the mutual coaction, the lifting effect will be increased so that an aircraft equipped with the improved arrangement will be far more stable and air-worthy than known types.

While the construction and arrangements of the improved airplane wing is that of a generally preferred form, obviously modifications and changes may be made without departing from the spirit of the invention and the scope of the claim.

I claim:—

An aircraft having a sustaining plane, and complementary airfoils fixed in oppositely and rearwardly slanting positions, to be widest apart across the leading edges, being spaced above and below the leading edge of said plane to define a Venturi opening.

MATTHEW ORR.